United States Patent [19]

Neier

[11] Patent Number: 5,462,354
[45] Date of Patent: Oct. 31, 1995

[54] LIVESTOCK FEED MIXER

[75] Inventor: Benjamin R. Neier, Dodge City, Kans.

[73] Assignee: Roto-Mix Enterprises, Ltd., Dodge City, Kans.

[21] Appl. No.: 257,642

[22] Filed: Jun. 9, 1994

[51] Int. Cl.[6] .................................................. B01F 7/24
[52] U.S. Cl. .......................... 366/314; 366/323; 366/603
[58] Field of Search ................................ 366/279, 314, 366/318, 319, 320, 321, 322, 323, 324, 331, 603, 606, 601, 64, 65, 60, 61, 241

[56] References Cited

U.S. PATENT DOCUMENTS

| | | | |
|---|---|---|---|
| 2,815,941 | 12/1957 | Schmale | 366/603 |
| 2,825,511 | 3/1958 | Byberg | 366/318 |
| 2,894,733 | 7/1959 | Wosmek | 366/603 |
| 2,953,360 | 9/1960 | Kline | 366/323 |
| 3,133,727 | 5/1964 | Luscombe | 366/603 |
| 5,020,918 | 6/1991 | Faccia | 366/279 |

*Primary Examiner*—Robert W. Jenkins
*Attorney, Agent, or Firm*—Zarley, McKee, Thomte, Voorhees, & Sease

[57] ABSTRACT

A livestock feed mixer includes a power source having a rotational power take-off. A mixer housing forms a mixing chamber for holding the feed ingredients and a rotatable mixing member is mounted within the mixing chamber. A variable speed power transfer mechanism is connected between the power take-off and the rotating mixing member for transferring power from the power source to the mixing member and for rotating the mixing member.

18 Claims, 5 Drawing Sheets

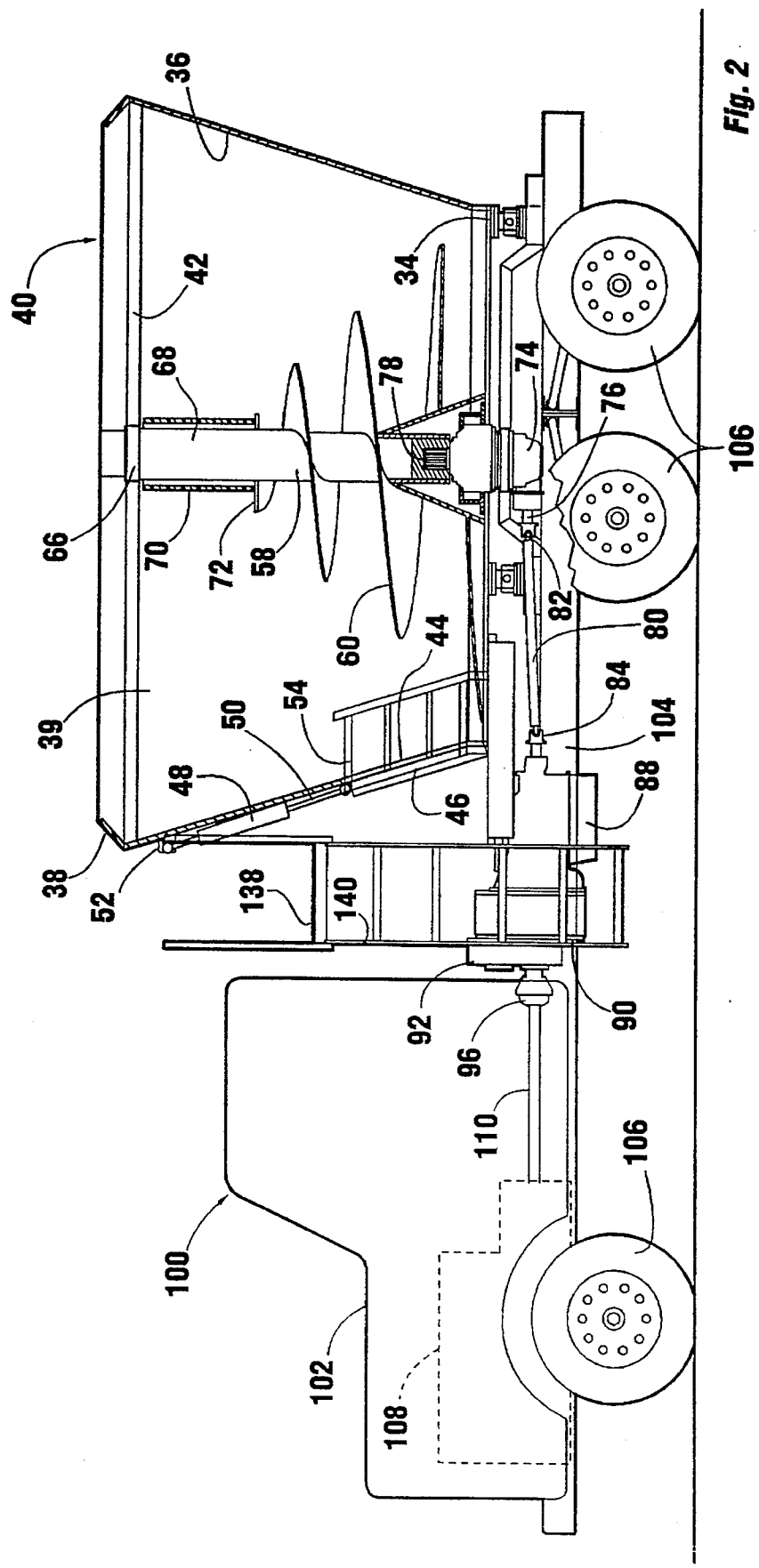

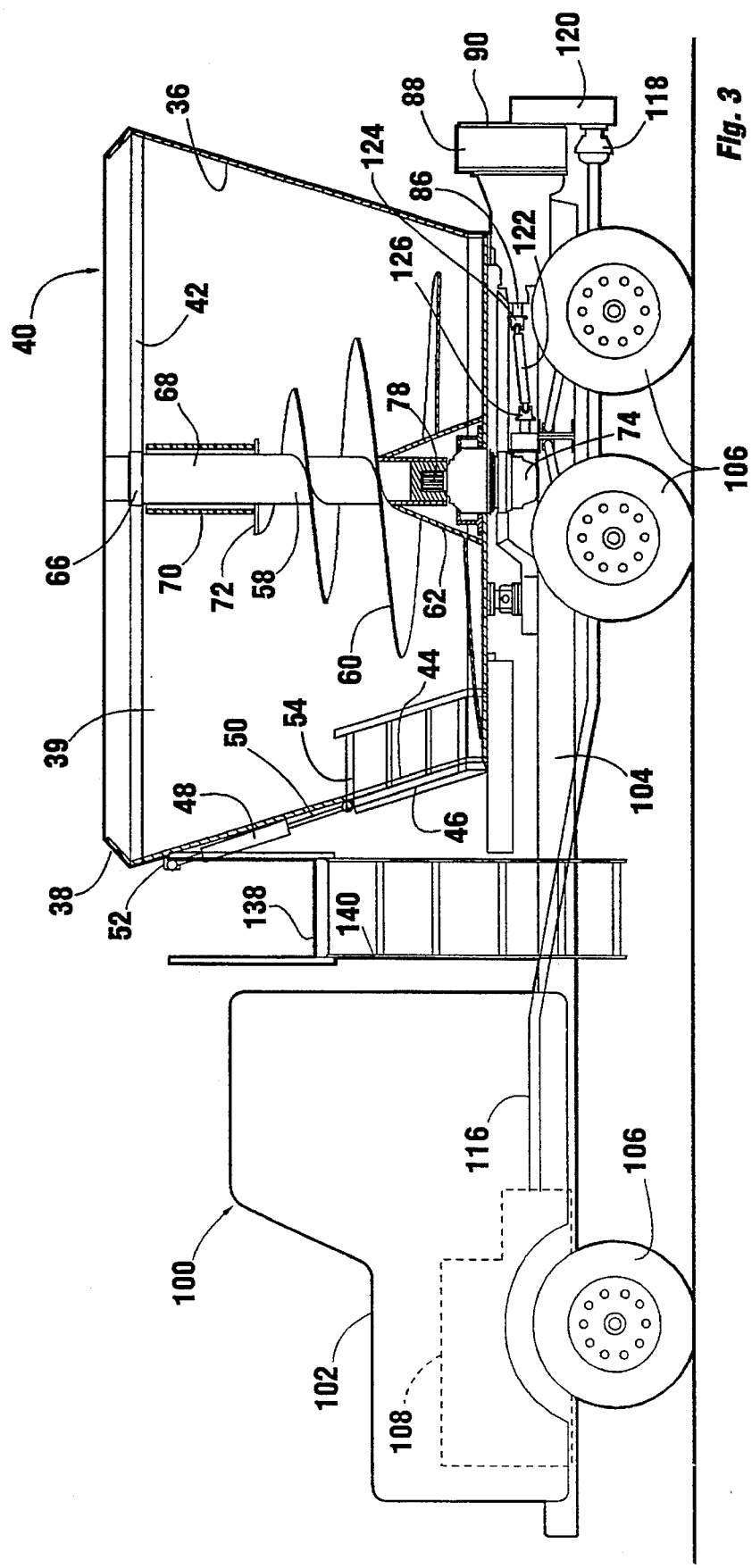

5,462,354

LIVESTOCK FEED MIXER

BACKGROUND OF THE INVENTION

This invention relates to a livestock feed mixer.

Various types of livestock feed mixers are presently known in the art. One type of mixer, known as a vertical axis mixer, utilizes a mixer housing having an open upper end and having a rotatable tapered auger rotatably mounted about a vertical axis within the mixer housing. The rotation of the tapered auger causes the feed to be agitated and mixed within the mixer housing. Another type of mixer utilizes a mixer housing having one or more augers or rotors rotatably mounted about one or more horizontal axes within the mixer chamber. This type of mixer is referred to as a horizontal axis mixer.

Many of these horizontal and vertical axis mixers are mounted upon trailers which can be drawn behind a conventional agricultural tractor and which can be driven by the power take-off of the tractor. Other types of mixers are mounted on self-propelled vehicles and are driven by the internal combustion engine which also drives the vehicle.

One problem encountered with presently known mixers is the difficulty in driving the rotational members within the mixers in a variety of conditions which may place undue stress on the power take off of either the tractor or the vehicle. For example, as the mixer is being filled with ingredients, the torque required to rotate the rotatable member or members increases. Under such conditions, the engine of either the tractor or the vehicle must be maintained at a high RPM level in order to achieve sufficient torque to drive the rotatable member when the mixer is full. This requires a higher horsepower engine for either the tractor or the vehicle.

Another problem occurs when the vehicle or the tractor are initially placed into gear for over the ground transport. If the mixer is full at that time, a reduction in the torque from the power take-off is encountered, thereby resulting in inadequate mixing of the feed within the mixer, or in some cases the killing of the engine of the vehicle or tractor.

Another problem is encountered with present devices during the initial startup of the engine of the vehicle or tractor when the mixer is full. If the vehicle or tractor has sufficient horsepower to drive the rotatable member when the mixer is full, there is a substantial amount of stress placed upon the power take-off and the drive train from the power take-off to the mixer during initial startup. In some cases this can result in damage to the power take-off or shafts or other items in the drive train.

Therefore a primary object of the present invention is the provision of an improved livestock feed mixer.

A further object of the present invention is the provision of an improved livestock feed mixer which can be driven by a tractor or vehicle having lower horsepower capacity than in prior devices.

A further object of the present invention is the provision of an improved livestock feed mixer which includes an automatic transmission which automatically compensates for increased load on the vehicle or tractor engine to reduce the gear ratio between the engine and the rotatable member being driven. This allows the feed mixer to be started while under full load with the power source at an idle speed.

A further object of the present invention is the provision of an improved livestock feed mixer which can be driven by a variable fluid driven motor capable of compensating for increased load on the vehicle or tractor engine to reduce the rotational velocity of the driven mixer member while at the same time maintaining an approximately constant horsepower output to the rotating mixer member within the mixer.

A further object of the present invention is the provision of an improved livestock feed mixer which reduces the stress on the vehicle or tractor engine and also on the drive train between the engine and the rotatable member within the mixer.

A further object of the present invention is the provision of an improved livestock feed mixer which maintains approximately the same torque or horsepower delivered to the rotating mixing member in the mixer throughout various RPMs of the engine of the tractor or truck.

A further object of the present invention is the provision of an improved livestock feed mixer which is economical to manufacture, durable in use and efficient in operation.

SUMMARY OF THE INVENTION

The foregoing objects may be achieved by a livestock feed mixer having a power source with a rotational power take-off. The mixer of this invention may also be used to mix materials other than livestock feed such as compost material. A mixing housing forms a mixing chamber for holding feed ingredients to be mixed. At least one rotatable mixing member is mounted within the mixing chamber for rotation about a mixing axis which may be either horizontal or vertical to cause mixing of the feed ingredients within the mixer housing. A variable power transfer device is connected between the power take-off and the rotatable mixing member for transferring power from the power source to the rotatable mixing member to rotate the mixing member. The power transfer device is capable of automatically reducing or increasing the rotational speed of the mixing member in response to an increase or decrease respectively in the power load that the mixing member places on the power source. The term power transfer device includes any variable shifting device such as an automatic transmission commonly used in vehicles or such as a variable speed pressure sensitive fluid driven motor capable of changing the rotational speed of its output in response to changes in fluid pressure at its inlet.

BRIEF DESCRIPTION OF THE DRAWINGS

FIG. 2 is a view similar to FIG. 1 showing a modified form of the invention on a self-propelled vehicle, and utilizing a mechanical automatic transmission.

FIG. 3 is a view similar to FIGS. 1 and 2 showing a modified form of the invention utilizing a mechanical transmission located at the rear of the vehicle.

DETAILED DESCRIPTION OF THE PREFERRED EMBODIMENT

Figure 1:
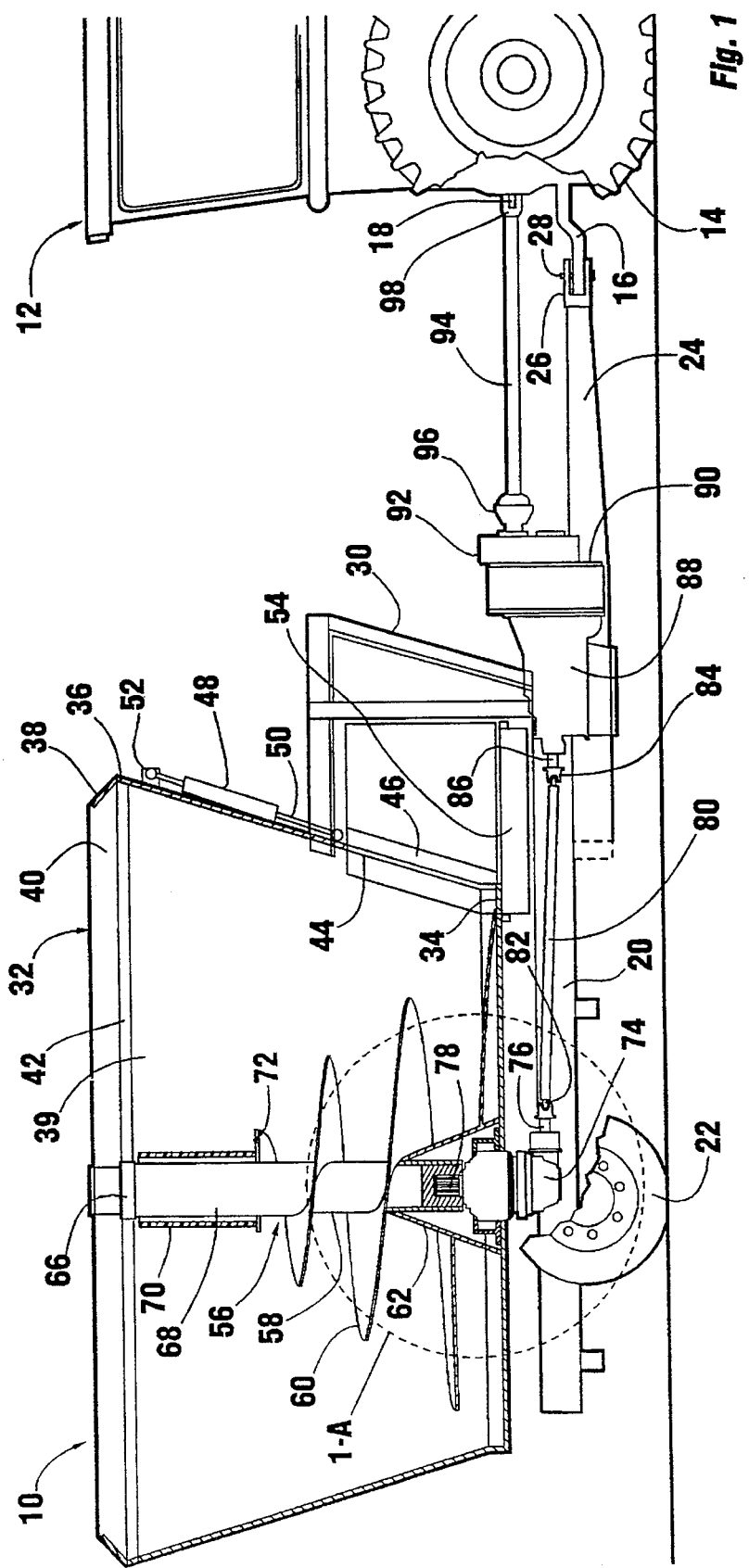
FIG. 1 is a side elevational view partially in section showing a feed mixer made according to the present invention and utilizing an automatic mechanical transmission.

Referring to FIG. 1 a feed mixer 10 is shown being drawn behind a tractor 12. Tractor 12 includes wheels 14, a hitch 16, and a PTO shaft 18.

Mixer 10 is a trailer mixer having a mixer frame 20 supported by ground engaging wheels 22. A tongue 24 extends forwardly from the frame 20 and includes a clevis 26 on its forward end which is attached to the hitch 16 of tractor 12 by means of a pin 28.

A platform frame 30 extends upwardly from the mixer frame 20 and provides a platform from which the operator can observe the contents of the mixer. A mixer housing 32 includes a bottom wall 34 which is supported on trailer frame 20. An outwardly tapered cone shaped side wall 36 extends upwardly from the bottom wall 34 and terminates at its upper end in an inwardly tapered rim 38. Rim 38 helps to contain the feed ingredients that are being mixed within the mixer. The bottom wall 34 and the tapered side wall 36 together with inwardly tapered rim 38 define a mixing chamber 39 having an open upper end 40. Extending across the open upper end 40 are cross frame members 42.

An outlet opening 44 is provided in side wall 36 adjacent the lower end thereof and is covered by a sliding door 46. A cylinder 48 having a rod 50 is mounted to the exterior of wall 36 by means of a cylinder mount 52. The cylinder rod 50 is attached to door 46 for raising the door to permit the discharge of the contents from the mixer chamber 39. A discharge conveyor 54 is adapted to discharge the contents from mixing chamber 39, and includes a powered conveyor (not shown) for carrying the discharged contents from the discharge opening 44 to the bin where the contents are deposited.

Figure 1A:
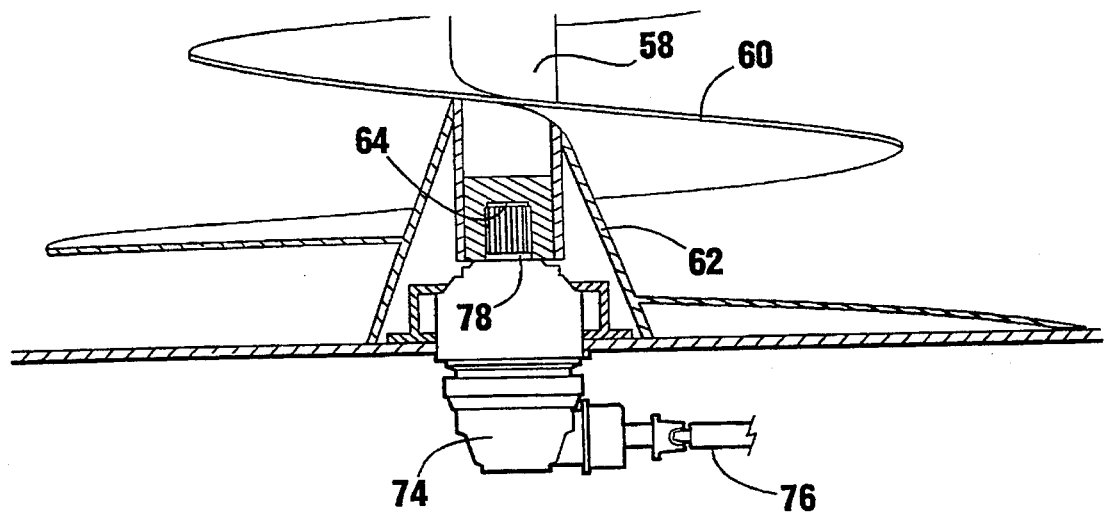
FIG. 1A is an enlarged detail taken along line 1A of FIG. 1.

Within mixing chamber 39 is a tapered auger 56 which is comprised of a vertical auger tube 58 having a tapered helical flighting 60 extending there around. The flighting 60 has a diameter at the bottom which closely approximates the size and shape of the bottom wall 34, and decreases in diameter progressively up to the upper end of the helical flighting 60 which terminates in a horizontal flange 72. The lower end of auger tube 58 includes a tapered cone shaped tube housing 62. The extreme lower end of auger tube 58 is provided with a shaft receptacle 64 (FIG. 1A), and the extreme upper end of tube 58 is rotatably mounted in an upper bearing 66 which is mounted to the cross frame members 42. Above the horizontal flange 72 is an exposed upper tube portion 68 which is surrounded by a loose cylindrical sleeve 70. Sleeve 70 is preferably made of a plastic material, and is adapted to rotate freely on the outer surface of the exposed upper tube portion 68. The loose mounting of sleeve 70 prevents hay or other ingredients from becoming caught on and wrapped around the exposed upper end of tube portion 68.

Below the bottom wall 34 is a right angle planetary gear box 74 which includes a horizontal input shaft 76 and an upstanding vertical splined output shaft 78. The gear box 74 preferably gears down from the input shaft 76 to the splined output shaft 78 at a ratio of approximately 58 to 1. While the ratio may vary without detracting form the invention, the gear down ratio should be sufficient to significantly reduce the RPMs of the tapered auger to a range of 50 RPMs or less when the mixer is mixing.

Connected to the input shaft 76 of the right angle box 74 is a drive shaft 80 having a U-joint 82 at one end and another U-joint 84 at the opposite end. U-joint 84 is connected to an output shaft 86 of an automatic transmission 88. Transmission 88 may be any automatic transmission such as commonly used in vehicles, preferably a heavy duty automatic transmission used in trucks. The preferred transmission is an automatic truck transmission manufactured by Central Detroit Diesel-Allison, Inc., Indianapolis, Ind., under the trade designation AT-545. Transmission 88 includes an input end 90 which is connected to the output of a speed increaser 92. The input end of the speed increaser 92 is connected to a drive shaft 94 by means of a U-joint 96. The forward end of drive shaft 94 is connected to the power take-off shaft 18 of the tractor 12 by means of a coupling 98.

A typical tractor power take-off shaft operates at approximately 1,000 RPMs. As the load on the tractor engine increases the RPMs may reduce, until at some point the load is so great that either damage occurs to the power take-off shaft or the engine dies. Below is a chart showing a preferred example of the way the drive train of the present invention operates. The speed increaser increases the speed from the power take-off shaft to the input of the transmission by a factor 2.42. The transmission includes four gears with the ratios of input RPMs to output RPMs as shown in the chart below. The right angle planetary gear 74 reduces the output of the transmission by a factor of 58:1 so that the auger rotates at 1/58th of the rotational speed of the output of the transmission.

| Gear | Tractor PTO (RPM) | Speed Increaser × 2.42 (RPM) | Transmission Ratio In:Out | Transmission Out (RPM) | Auger ÷ 58 (RPM) |
| --- | --- | --- | --- | --- | --- |
| 1st | 0–754 | 0–1825 | 3.45:1 | 0–529 | 0–9.1 |
| 2nd | 492–752 | 1192–1822 | 2.25:1 | 530–810 | 9.1–14.0 |
| 3rd | 468–867 | 1134–2100 | 1.4:1 | 810–1500 | 14.0–25.9 |
| 4th | 619–1000 | 1500–2420 | 1:1 | 1500–2420 | 25.9–41.7 |

The transmission 88 is adapted to sense the rotational output from the transmission, and to shift at various shift points which may be set or adjusted. In the example below the shift points are shown to be at 530 RPMs for shift from first to second gear; at 810 RPMs for shifting from second to third gear; and at 1,500 RPMs for shifting from third gear to fourth gear. The transmission will shift down from gears four to gear one at approximately the same shift points, but the down shift points may vary slightly from the up shifting points.

When the mixer is empty, and the tractor power take-off shaft is initially actuated, the transmission will shift upwardly from first to second to third to fourth gear quickly and will operate at approximately its maximum RPMs (2,420 RPMs), resulting in a mixer auger speed of approximately 41.7 RPMs. As the ingredients are loaded into the mixer, the horsepower required to drive the system increases due to friction and binding within the mixer. When the load increases to the point that the transmission output has been reduced to approximately 1,500 RPMs, the transmission will shift down from fourth to third gear, thereby delivering horsepower to the auger while rotating the auger at a reduced rotational speed. As the load increases the transmission will shift from third to second when the transmission output is 810 RPMs, and from second gear to first gear when the RPM output of the transmission reduces to approximately 530 RPMs.

With the above example it has been found that a tractor engine having the capability of delivering 80 horsepower can operate a larger mixer with capacity up to 750 cubic feet in third or fourth gears. Prior devices have required tractors with engines capable of delivering at least 120 horsepower.

Another phenomena occurs when the tractor begins moving to pull the trailer along the bins for discharging the feed. As the tractor drive gears engage, an additional load is placed on the tractor engine, and this may result in reduced horsepower to the power take-off shaft. The transmission 88 senses a reduced output in its output shaft and accordingly shifts down so that the power take-off shaft can continue to rotate the auger 56 at a reduced speed.

The transmission 88 causes the horsepower applied to the auger 56 to remain relatively constant due to the down shifting of the transmission. It is this feature of the transmission 88 which permits the device to operate despite reduced horsepower delivered by the power take-off shaft 18 from tractor 12. Furthermore, this arrangement minimizes the stress placed on the power take-off shaft 18 and the engine of the tractor. In prior devices which did not utilize the automatic transmission 88, the increased horsepower requirements on shaft 18 could ultimately result in damage to the power take-off shaft 18, the engine of the tractor 12, or the drive train from the power take-off shaft to the mixer. In the present invention the horsepower requirements applied to shaft 18 do not increase to levels which would damage the tractor or the shaft 18. This is also true during sudden starts and stops of the tractor or during startup, because the transmission 88 automatically shifts down to first gear during start up. It has been found that an 80 horsepower engine can rotate auger 56 at idle speed with transmission 88 in first gear.

Referring to FIG. 2 a modified form of the invention is shown mounted upon a truck mixer 100. Truck mixer 100 includes a truck 102 having a truck frame 104. Wheels 106 support the truck frame 104 on a supporting surface. Truck 102 includes an engine 108 having a conventional power take-off shaft (not shown). The power take-off shaft from engine 108 is connected to a drive shaft 110 which is directly connected to the input end of the speed increaser 92. While speed increaser 92 is shown in this configuration, it is possible to eliminate the speed increaser 92 in many applications where the power take-off from a truck engine is used. The reason for this is that many power take-off shafts from truck engines operate at 1,500 RPMs which is sufficiently fast to eliminate the need in some cases for the speed increaser 92. Also, the speed increaser can be either a gear box or a cog belt drive. The gear box configuration reverses the rotational direction whereas the cog belt drive does not.

Transmission 88, shaft 80, right angle planetary gear 74 and splined shaft 78 are all the same as shown in the device of FIG. 1. The same advantages are obtained with the portable truck mounted device shown in FIG. 2 as are achieved with the device in FIG. 1.

Figure 4:
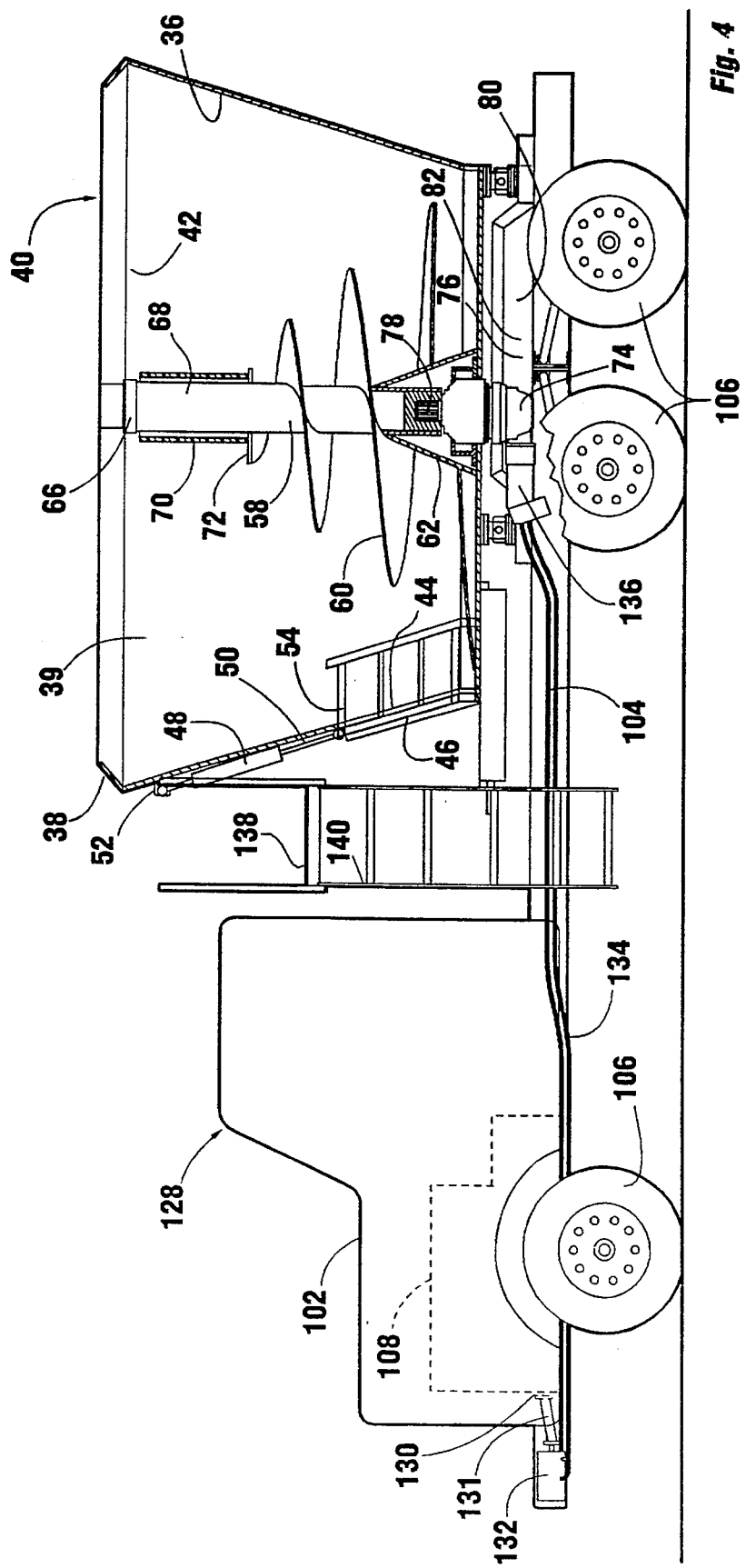
FIG. 4 is a view similar to FIGS. 1–3, but showing a modified form of the invention utilizing a variable speed hydraulic motor for driving the mixer.

Referring to FIG. 3 a modified form of the invention is shown which utilizes a longer drive shaft 116 which extends to the rear of the vehicle and which is connected to the speed increaser 120 by means of a coupling 118. Transmission 88 is reversed with its input end 90 facing the rear of the vehicle and with its output end 86 extending forwardly. A drive shaft 122 is connected to the right angle gear box 74 by means of a U-joint 126 and is connected to the output shaft 86 of the transmission 88 by means of a U-joint 124. The only difference between the device shown in FIG. 3 and the device shown in FIG. 4 is that the transmission is mounted at the rear of the vehicle which has some advantages from the standpoint of accessibility, Referring to FIG. 4 a modified form of the invention is shown and is designated by the numeral 128. Truck mixer 128 includes a forward power take-off shaft 130 which is connected by means of a drive shaft 131 to a front mounted hydraulic pump 132. Pump 132 can be connected to a power take-off shaft such as shaft 130 or can be directly connected to the crank shaft of the engine. Extending rearwardly from the pump 132 are hydraulic lines 134 which are connected at their rear end to a hydraulic motor 136. Hydraulic motor 136 is connected to the right angle planetary gear box 74, and provides a function very similar to that provided by the automatic transmission 88 in the prior devices of FIGS. 1–3. Motor 136 is a variable speed horsepower or pressure sensitive motor capable of operating under input pressures of as high as 6,000 PSI. This type of variable speed motor is to be distinguished from a typical hydrostatic pump and motor combination which is adjustable by means of changing the stroke and volume of the pump. The horsepower or pressure sensitive variable motor of the present invention is adapted to provide a substantially constant horsepower out put in response to variations in the input pressure to the motor. An example of a preferred variable volume hydraulic motor used for the present invention is manufactured by Volvo Company, Boras, Sweden under the trade designation B12–160. However, other variable speed motors which are capable of maintaining a substantially constant horsepower output in response to variation in input pressure will work in the present invention. The output of the motor 136 is connected to the right angle planetary gear box 74 and the remaining components of the mixer are substantially the same as shown in the prior FIGS. 1–3. A stand 138 having a ladder 140 is provided at the front of the mixer box in order to permit observation of the interior 39 of the mixing chamber.

In operation of the device shown in FIG. 4, the engine 108 is started. The pump 132 delivers a pressure of from 0 PSI to as high as 6,000 PSI to the motor 136. The motor 136 responds by driving the planetary gear 74 whenever the pressure is within the approximate range of 2,200 PSI up to 6,000 PSI. When the mixer is full, the resistance of the rotation of the shaft 58 causes the pressure build up at the input end of the pump. The pump varies rotational output inversely in response to this pressure. As the input pressure to the pump 136 increases, the rotational velocity of the output decreases, but the horsepower delivered to the auger 56 remains approximately constant. Thus the auger 56 will rotate when the engine is operating at low RPMs and when the mixer is full.

It has been found with the use of either the transmission 88 shown in FIGS. 1–3 or the hydraulic motor 136 shown in FIG. 4, that an engine having a horsepower of from 80 to 120 horsepower (preferred 88 horsepower), is sufficient to operate the mixer even when the mixer is full. In prior devices, engines having horsepower of from 130 to 140 horsepower were traditionally required.

Furthermore, even with engines of higher horsepower, the stress on the power take-off of the engine is reduced by virtue of the fact that the transmission 88 or the hydraulic motor 136 adjust the drive ratios to the auger 56, thereby reducing the stress on the power take-off shaft.

Thus the present invention requires less horsepower than previous devices. It also mixes the material faster than prior devices and is particularly effective in the cutting of hay and the mixing of hay into the feed ingredients. Hay causes binding in most mixers, and very large resistance forces are created by the increase in the amount of hay in the mixture. The present invention provides sufficient torque to the auger 56 to permit very high hay content in the mixture being mixed.

Another advantage achieved with the present invention is that it unloads faster and more evenly than in prior devices due to the smooth even action of the auger 56.

Another advantage achieved with the present invention is the fact that the mixer can be driven even when the engine is at idle speeds. This is a result difficult if not impossible to achieve with prior devices.

In the drawings and specification there has been set forth a preferred embodiment of the invention, and although specific terms are employed, these are used in a generic and descriptive sense only and not for purposes of limitation. Changes in the form and the pro-portion of parts as well as in the substitution of equivalents are contemplated as circumstances may suggest or render expedient without departing form the spirit or scope of the invention ask further defined in the following claims.

What is claimed is:

1. Apparatus for mixing ingredients comprising:

a power source having a rotational power take-off;

a mixer housing forming a mixing chamber for holding said ingredients;

at least one rotatable mixing member mounted within said mixing chamber for rotation about a mixing axis to cause mixing of said ingredients within said mixer housing;

a variable power transfer device connected between said power take-off and said rotatable mixing member for transferring power from said power source to said rotatable mixing member for rotating said mixing member;

said power transfer device being capable of automatically reducing or increasing the rotational speed of said mixing member in response to an increase or decrease, respectively in the power load said mixing member places on said power source.

2. Apparatus according to claim 1 wherein said variable power transfer device comprises an automatic transmission.

3. Apparatus according to claim 2 wherein said automatic transmission includes an input end adapted to be rotatable at an input velocity and having an output end adapted to rotate at an output velocity in response to rotation of said input end, said transmission being adapted to automatically shift to change the ratio of said output velocity to said input velocity in response to changes in said power load placed on said power source by said mixing member, first drive connection means connecting said power take-off to said input end of said transmission; and second drive connection means connecting said output end of said transmission to said mixing member for rotating said mixing member.

4. Apparatus according to claim 2 wherein transmission can be locked to only shift up as far as desired.

5. Apparatus according to claim 1 wherein said variable power transfer device comprises a fluid driven motor.

6. Apparatus according to claim 5 and further comprising a fluid pump connected to and driven by said power source, said fluid driven motor being connected to said pump for receiving pressurized fluid therefrom.

7. Apparatus according to claim 5 wherein said fluid driven motor includes a rotational output member adapted to rotate in response to receiving pressurized fluid from said pump, means connecting said output member of said pump to said rotatable mixing member for rotating said mixing member, said fluid driven motor being a variable speed pressure sensitive motor capable of changing the rotational speed of said output member in response to changes in the fluid pressure of said pressurized fluid received from said pump.

8. Apparatus according to claim 1 wherein said mixing axis is vertical.

9. Apparatus according to claim 1 and further comprising a gear box connected between said power transfer device and said rotatable mixing member, said gear box reducing the rotational velocity at which said power transfer device rotates said mixing member.

10. Apparatus according to claim 9 wherein said power transfer device includes an output member adapted to rotate at an output velocity, said gear box being connected to said output member and being adapted to reduce the rotational velocity of said mixing member up to 250 times less than said output velocity of said output member.

11. Apparatus according to claim 9 wherein said gear box comprises a right angle planetary gear box.

12. Apparatus according to claim 1 wherein said power source comprises an internal combustion engine of a self propelled vehicle.

13. Apparatus according to claim 12 wherein said mixer housing is mounted on and carried by said vehicle.

14. Apparatus according to claim 12 and further comprising a trailer having ground engaging wheels, said mixer housing being mounted on said trailer, said trailer being detachably connected to and drawn by said self propelled vehicle.

15. Apparatus for mixing ingredients comprising:

a power source having a rotational power takeoff;

a mixer housing forming a mixing chamber for holding said ingredients;

a rotatable mixing member mounted within said mixing chamber for rotation about a mixing axis to cause mixing of said ingredients within said mixer housing;

an automatic transmission having an input end adapted to be rotatably driven at an input velocity and having an output end adapted to rotate at an output velocity in response to rotation of said input end, said transmission being adapted to automatically shift to change the ratio of said output velocity to said input velocity in response to changes in the rotational speed of said output velocity of said transmission output end;

first drive connection means connecting said power take-off to said input end of said transmission;

second drive connection means connecting said output end of said automatic transmission to said mixing member for rotating said mixing member.

16. Apparatus for mixing ingredients comprising:

a power source having a rotational power take-off;

a mixer housing forming a mixing chamber for holding said ingredients;

a rotatable mixing member mounted within said mixing chamber for rotation about a mixing axis to cause mixing of said ingredients within said mixer housing;

a fluid driven pump connected to and driven by said power take-off;

a fluid driven motor connected to said pump for receiving pressurized fluid therefrom; said motor having a rotational output member adapted to rotate in response to receiving pressurized fluid from said pump;

means connecting said output member of said pump to said rotatable mixing member for rotating said mixing member;

said motor being a variable speed pressure sensitive motor capable of changing the rotational speed of said output member in response to changes in the fluid pressure of said pressurized fluid received from said pump.

17. Apparatus for mixing ingredients comprising:

a power source having a rotational power take-off;

a mixer housing having a bottom wall and a continuous upstanding side wall forming a mixing chamber, said side wall having a bottom edge extending around said bottom wall, said side wall extending upwardly from said bottom wall and outwardly from said mixing chamber, said side wall having an upper canted rim which in cross section extends from a lower rim edge upwardly and inwardly to an upper rim edge;

a mixing member mounted within said mixing chamber for rotation about a vertical axis to cause mixing of said ingredients within said mixer housing;

a variable power transfer device connected between said power take-off and said rotatable mixing member for rotating said mixing member.

18. Apparatus for mixing ingredients comprising:

a power source having a rotational power take-off;

a mixer housing forming a mixing chamber for holding said ingredients;

a mixing member mounted within said mixing chamber for rotation about a vertical axis to cause mixing of said ingredients within said mixer housing, said mixing member comprising a vertical column having a plurality flightings mounted thereon, said column having at least an exposed portion thereof free from flightings;

a sleeve loosely surrounding said exposed portion of said column so as to be free to rotate freely relative to said column;

a variable power transfer device connected between said power takeoff and said rotatable mixing member for rotating said mixing member.

* * * * *